(12) United States Patent
Yamashita et al.

(10) Patent No.: US 8,718,108 B2
(45) Date of Patent: May 6, 2014

(54) REPETITION FREQUENCY CONTROL DEVICE

(75) Inventors: Tomoyu Yamashita, Miyagi (JP); Akiyoshi Irisawa, Miyagi (JP)

(73) Assignee: Advantest Corporation, Tokyo (JP)

( * ) Notice: Subject to any disclaimer, the term of this patent is extended or adjusted under 35 U.S.C. 154(b) by 324 days.

(21) Appl. No.: 13/310,130

(22) Filed: Dec. 2, 2011

(65) Prior Publication Data

US 2012/0163404 A1 Jun. 28, 2012

(30) Foreign Application Priority Data

Dec. 27, 2010 (JP) ................. 2010-289901

(51) Int. Cl.
*H01S 3/139* (2006.01)
*H01S 3/10* (2006.01)

(52) U.S. Cl.
USPC .............. 372/32; 372/29.011; 372/38.01

(58) Field of Classification Search
USPC .................. 372/32, 29.011, 38.01
See application file for complete search history.

(56) References Cited

U.S. PATENT DOCUMENTS

| | | | |
|---|---|---|---|
| 5,585,913 A | 12/1996 | Hariharan et al. | |
| 5,778,016 A | 7/1998 | Sucha et al. | |
| 6,396,856 B1 | 5/2002 | Sucha et al. | |
| 8,306,078 B2 * | 11/2012 | Yamashita et al. | 372/32 |
| 2002/0097761 A1 | 7/2002 | Sucha et al. | |
| 2008/0165355 A1 | 7/2008 | Yasui et al. | |
| 2009/0296749 A1 | 12/2009 | Sucha et al. | |
| 2011/0170875 A1 | 7/2011 | Yamashita et al. | |
| 2011/0216791 A1 | 9/2011 | Yamashita | |

FOREIGN PATENT DOCUMENTS

| | | |
|---|---|---|
| JP | 7-311228 A | 11/1995 |
| JP | 10-96610 A | 4/1998 |
| JP | 2002-43664 A | 2/2002 |
| JP | 4565198 B2 | 10/2010 |
| JP | 4782889 B1 | 9/2011 |
| WO | 2011/062114 | 5/2011 |

OTHER PUBLICATIONS

U.S. Appl. No. 13/299,568 to Tomoyu Yamashita et al., filed Nov. 18, 2011.
Great Britain Office action, mail date is May 8, 2012.
U.S. Appl. No. 13/299,568 is a U.S. family member of JP 4782889B1.
U.S. Appl. No. 13/299,568 to Tomoyu Yamashita et al., which was filed on Nov. 18, 2011.

\* cited by examiner

*Primary Examiner* — Jessica Stultz
*Assistant Examiner* — Marcia Golub-Miller
(74) *Attorney, Agent, or Firm* — Greenblum & Bernstein, P.L.C.

(57) ABSTRACT

According to the repetition frequency control device, a master laser outputs a master laser light pulse the repetition frequency of which is controlled to a predetermined value. A slave laser outputs a slave laser light pulse. A reference comparator compares a voltage of a reference electric signal the repetition frequency of which is the predetermined value and a predetermined voltage with each other, thereby outputting a result thereof. A measurement comparator compares a voltage based on a light intensity of the slave laser light pulse and the predetermined voltage with each other, thereby outputting a result thereof. A phase difference detector detects a phase difference between the output from the reference comparator and the output from the measurement comparator. A loop filter removes a high-frequency component of an output from the phase difference detector.

7 Claims, 4 Drawing Sheets

REPETITION FREQUENCY CONTROL DEVICE

BACKGROUND ART

1. Technical Field of the Invention

The present invention relates to control of the repetition frequency of a laser light pulse.

2. Related Art

A system which causes a difference in repetition frequency between two lasers to be constant by independently controlling the repetition frequencies of the two lasers has conventionally been known (refer to FIG. 18 and [0077] of a patent document 1 (Japanese Patent No. 4565198), for example).

SUMMARY OF THE INVENTION

It is an object of the present invention to change a difference in repetition frequency between two lasers.

According to the present invention, a repetition frequency control device includes: a master laser that outputs a master laser light pulse the repetition frequency of which is controlled to a predetermined value; a slave laser that outputs a slave laser light pulse; a reference comparator that compares a voltage of a reference electric signal the repetition frequency of which is the predetermined value and a predetermined voltage with each other, thereby outputting a result thereof; a measurement comparator that compares a voltage based on a light intensity of the slave laser light pulse and the predetermined voltage with each other, thereby outputting a result thereof; a phase difference detector that detects a phase difference between the output from the reference comparator and the output from the measurement comparator; a loop filter that removes a high-frequency component of an output from the phase difference detector; and an adder that adds a repetition frequency control signal to an output from the loop filter, wherein: the repetition frequency control signal has a constant repetition cycle; and the repetition frequency of the slave laser light pulse changes according to the output from the adder.

According to the thus constructed repetition frequency control device, a master laser outputs a master laser light pulse the repetition frequency of which is controlled to a predetermined value. A slave laser outputs a slave laser light pulse. A reference comparator compares a voltage of a reference electric signal the repetition frequency of which is the predetermined value and a predetermined voltage with each other, thereby outputting a result thereof. A measurement comparator compares a voltage based on a light intensity of the slave laser light pulse and the predetermined voltage with each other, thereby outputting a result thereof. A phase difference detector detects a phase difference between the output from the reference comparator and the output from the measurement comparator. A loop filter removes a high-frequency component of an output from the phase difference detector. An adder adds a repetition frequency control signal to an output from the loop filter. The repetition frequency control signal has a constant repetition cycle. The repetition frequency of the slave laser light pulse changes according to the output from the adder.

According to the repetition frequency control device of the present invention, the predetermined voltage may be a ground electric potential.

According to the repetition frequency control device of the present invention, the resonator length of the slave laser may change according to the output from the adder.

According to the repetition frequency control device of the present invention, the slave laser may include a piezo element; the output from the adder may be fed to the piezo element; and the resonator length of the slave laser may be changed by extension and contraction of the piezo element.

According to the present invention, the repetition frequency control device may include: a photoelectric conversion unit that receives the slave laser light pulse; and a low-pass filter that removes a high-frequency component of the output from the photoelectric conversion unit.

According to the repetition frequency control device of the present invention, the repetition frequency control signal may be output from an arbitrary wave generator.

According to the present invention, the repetition frequency control device may include: a master-side reference comparator that compares the voltage of the reference electric signal the frequency of which is the predetermined value and the predetermined voltage with each other, thereby outputting a result thereof; a master-side measurement comparator that compares a voltage of a master-side measurement electric signal having a voltage based on a light intensity of the master laser light pulse, and a frequency of the predetermined value, and the predetermined voltage with each other, thereby outputting a result thereof; a master-side phase difference detector that detects a phase difference between the output from the master-side reference comparator and the output from the master-side measurement comparator; and a master-side loop filter that removes a high-frequency component of an output from the master-side phase difference detector, wherein the repetition frequency of the master laser light pulse changes according to an output from the master-side loop filter.

PREFERRED EMBODIMENTS

A description will now be given of an embodiment of the present invention referring to drawings.

Figure 1:
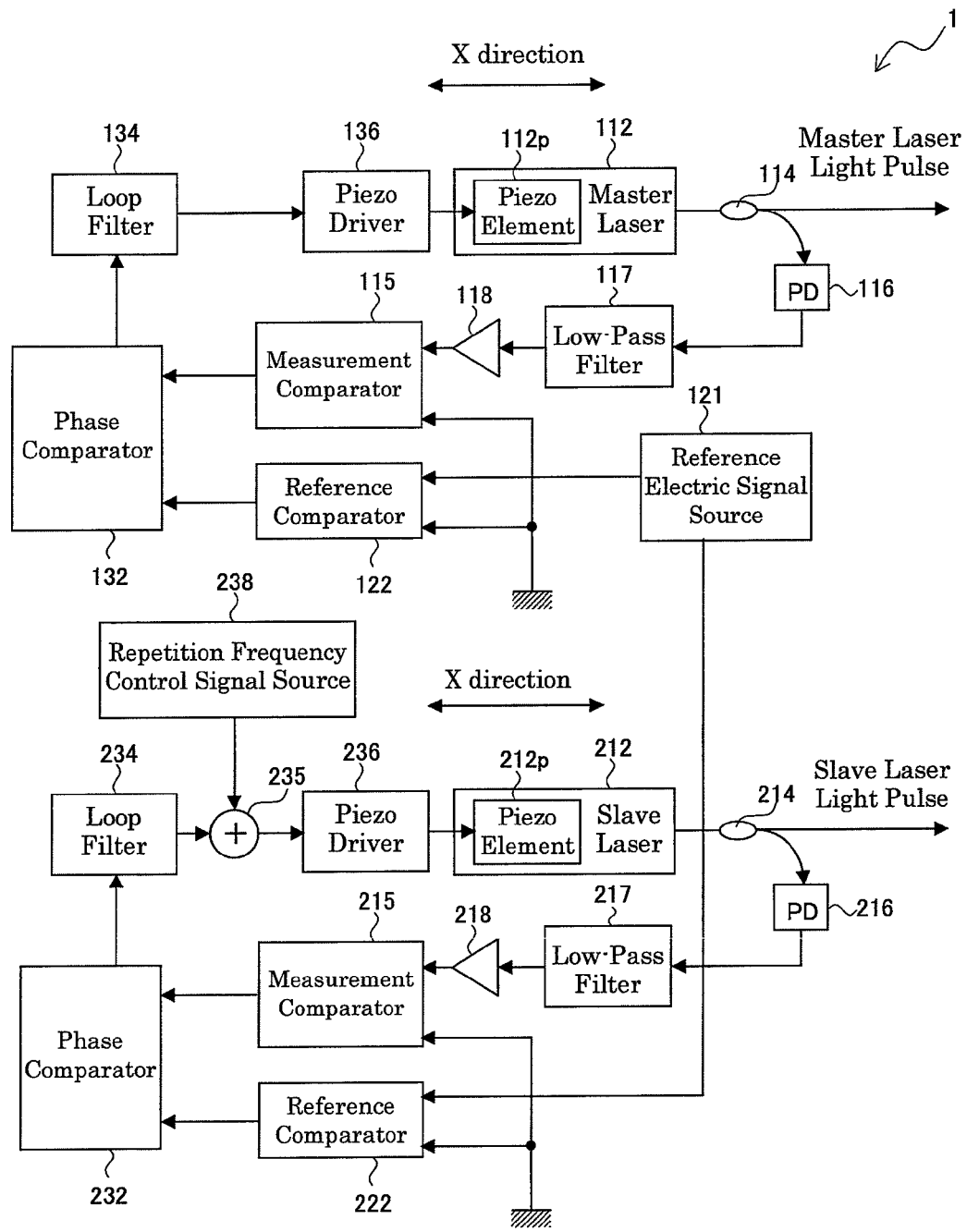
FIG. 1 is a functional block diagram showing a configuration of a repetition frequency control device 1 according to the embodiment of the present invention.
Figure 2:
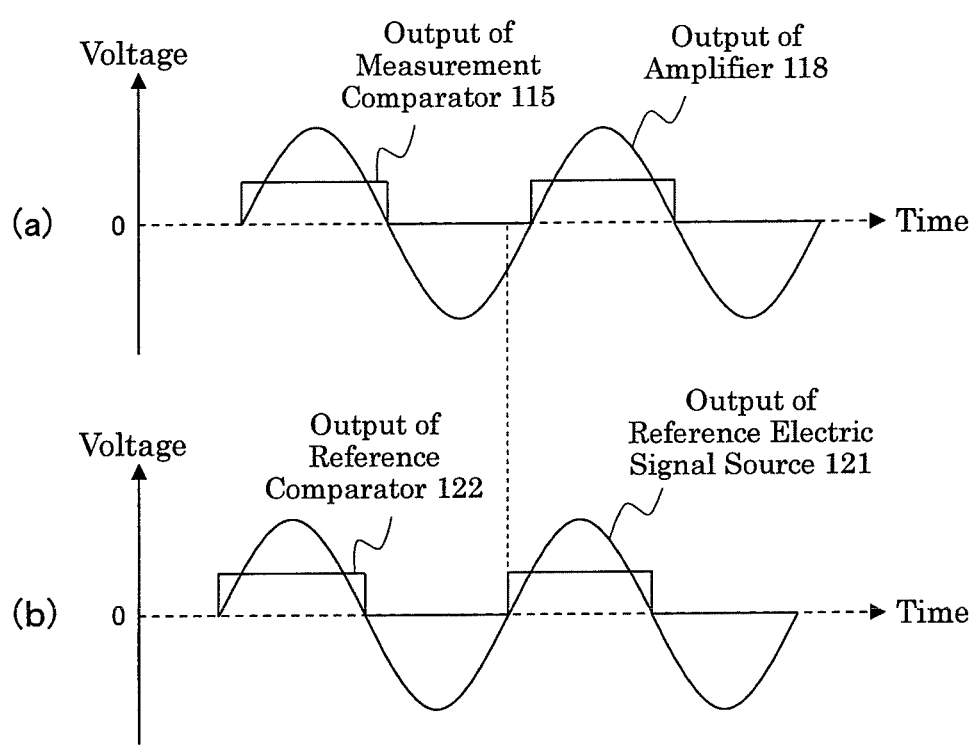
FIG. 2 includes a chart showing a waveform of an output voltage of a measurement comparator 115 (FIG. 2(*a*)), and a chart showing a waveform of an output voltage of a reference comparator 122 (FIG. 2(*b*)) according to the embodiment of the present invention.

FIG. 1 is a functional block diagram showing a configuration of a repetition frequency control device 1 according to the embodiment of the present invention. FIG. 2 includes a chart showing a waveform of an output voltage of a measurement comparator 115 (FIG. 2(*a*)), and a chart showing a waveform of an output voltage of a reference comparator 122 (FIG. 2(*b*)) according to the embodiment of the present invention.

A repetition frequency control device 1 according to the embodiment of the present invention includes a master laser 112, an optical coupler 114, the measurement comparator (master-side measurement comparator) 115, a photodiode (master-side photoelectric conversion unit) 116, a low-pass filter 117, an amplifier 118, a reference electric signal source 121, the reference comparator (master-side reference comparator) 122, a phase comparator (master-side phase difference detector) 132, a loop filter (master-side loop filter) 134, a piezo driver 136, a slave laser 212, an optical coupler 214, a measurement comparator 215, a photodiode (photoelectric conversion unit) 216, a low-pass filter 217, an amplifier 218, a reference comparator 222, a phase comparator (phase difference detector) 232, a loop filter 234, an adder 235, a piezo driver 236, and a repetition frequency control signal source 238.

The master laser 112 outputs a master laser light pulse. It should be noted that the repetition frequency of the master laser light pulse is controlled to a predetermined value. The predetermined value is equal to the frequency (such as 50 MHz) of a reference electric signal output from the reference electric signal source 121.

The master laser 112 includes a piezo element 112p. The piezo element 112p extends and contracts in an X direction (horizontal direction in FIG. 1) as a result of application of a voltage of an output from the loop filter 134 after amplification by the piezo driver 136. The extension/contraction in the X direction of the piezo element 112p changes a laser resonator length of the master laser 112. The change of the laser resonator length changes the repetition frequency of the master laser light pulse.

The optical coupler 114 receives the master laser light pulse output from the master laser 112, and outputs the master laser light pulse to the photodiode 116 and the outside at a ratio of 1:9 in power, for example. The optical power of the master laser light pulse fed to the photodiode 116 is thus 10% of the optical power of the master laser light pulse output from the master laser 112, for example.

The photodiode (master-side photoelectric conversion unit) 116 receives the master laser light pulse from the optical coupler 114, and converts the master laser light pulse into an electric signal. It should be noted that the repetition frequency of the master laser light pulse is controlled to 50 MHz. As a result, the electric signal has a component of the frequency 50 MHz (component of the frequency of the reference electric signal), and a high-frequency component (frequency is much higher than 50 MHz).

The low-pass filter 117 removes the high-frequency component of the output from the photodiode 116. The cutoff frequency of the low-pass filter 117 is 70 MHz, for example. Thus, when the low-pass filter 117 receives the output from the photodiode 116, the high-frequency component is removed, and the component of the frequency 50 MHz (component of the frequency of the reference electric signal) passes. A term "remove" does not necessarily imply complete removal only, and a case in which the high-frequency component is slightly left is also included in "remove". In the following section, "remove" has the same meaning.

The amplifier 118 amplifies the output from the low-pass filter 117. An output from the amplifier 118 is referred to as measurement electric signal. Obtaining the measurement electric signal corresponds to a measurement of the light intensity of the master laser light pulse.

The master-side measurement electric signal is obtained by amplifying the output from the photodiode 116 by the amplifier 118, and thus has a voltage based on the light intensity of the master laser light pulse. Moreover, the master-side measurement electric signal has passed through the low-pass filter 117, and thus has a frequency of the predetermined value (frequency of the reference electric signal).

It is conceivable to switch the low-pass filter 117 and the amplifier 118 with each other, and to feed the output from the photodiode 116 via the amplifier 118 to the low-pass filter 117. In this case, the master-side measurement electric signal is the output from the low-pass filter 117. In either case, the master-side measurement electric signal remains the signal based on the output from the low-pass filter 117.

The reference electric signal source 121 outputs the reference electric signal having a frequency of the predetermined value (50 MHz, for example).

The reference comparator (master-side reference comparator) 122 compares the voltage of the reference electric signal and the predetermined voltage with each other, thereby outputting a result thereof. It should be noted that the predetermined voltage is the ground electric potential, for example. Referring to FIG. 1, out of two input terminals of the reference comparator 122, one is connected to the output from the reference electric signal source 121, and the other is grounded. The signal output from the reference comparator 122 is determined according to a difference in magnitude between the voltages input to the two input terminals of the reference comparator 122.

If the voltage of the output from the reference electric signal source 121 is greater than the ground electric potential (=0[V]), the voltage of the signal output from the reference comparator 122 takes a predetermined positive value referring to FIG. 2(b), for example. If the voltage of the output from the reference electric signal source 121 is less than or equal to the ground electric potential (=0[V]), the voltage of the signal output from the reference comparator 122 takes 0[V].

The measurement comparator (master-side measurement comparator) 115 compares the voltage of the master-side measurement electric signal and the predetermined voltage (such as the ground electric potential), and outputs a result thereof. In other words, the measurement comparator 115 receives the output from the amplifier 118 and the predetermined voltage, compares both of them with each other, and outputs a result thereof.

If the voltage of the output from the amplifier 118 is greater than the ground electric potential (=0[V]), the voltage of the signal output from the measurement comparator 115 takes a predetermined positive value referring to FIG. 2(a), for example. If the voltage of the output from the amplifier 18 is less than or equal to the ground electric potential (=0[V]), the voltage of the signal output from the measurement comparator 115 takes 0[V].

The phase comparator (master-side phase difference detector) 132 detects and outputs a phase difference between the output from the reference comparator 122 and the output from the measurement comparator 115.

The loop filter (master-side loop filter) 134 removes a high-frequency component of an output from the phase comparator 132.

The piezo driver 136 is a power amplifier, for example, and amplifies the output from the loop filter 134. The output from the piezo driver 136 is fed to the piezo element 112p. As a result, the piezo element 112p extends/contracts in the X direction. It should be noted that the piezo element 112p is extended/contracted so that the phase difference detected by the phase comparator 132 is a constant value (such as 0 degree, 90 degrees, or −90 degrees). As a result, the repetition frequency of the master laser light pulse can precisely be adjusted to the frequency (such as 50 MHz) of the reference electric signal.

The slave laser 212 outputs a slave laser light pulse.

The slave laser 212 includes a piezo element 212p. The piezo element 212p extends/contracts in the X direction (horizontal direction in FIG. 1) by the voltage of the output from the adder 235 being amplified and applied by the piezo driver 236. The extension/contraction of the piezo element 212p in the X direction changes the laser resonator length of the slave laser 212. The change in the laser resonator length changes the repetition frequency of the slave laser light pulse.

The optical coupler 214 is a similar component to the optical coupler 114, receives the slave laser light pulse output from the slave laser 212, and outputs the slave laser light pulse to the photodiode 216 and the outside at a ratio, 1:9, in power.

The photodiode (photoelectric conversion unit) 216 is a component similar to the photodiode 116, receives the slave laser light pulse from the optical coupler 214, and converts the slave laser light pulse into an electric signal. The repetition frequency of the slave laser light pulse is controlled to a value (considered to be close to 50 MHz) obtained by adding a value corresponding to the repetition frequency control signal to 50 MHz (frequency of the reference electric signal) (refer to FIG. 3(c)). As a result, the electric signal has a component close to the frequency 50 MHz, and a high-frequency component (frequency is much higher than 50 MHz).

The low-pass filter 217 is a component similar to the low-pass filter 117, and removes the high-frequency component of an output from the photodiode 216. The cutoff frequency of the low-pass filter 217 is 70 MHz, for example. Thus, when the low-pass filter 217 receives the output from the photodiode 216, the high-frequency component is removed, and the component of the frequency close to 50 MHz passes.

The amplifier 218 is a component similar to the amplifier 118, and amplifies an output from the low-pass filter 217. An output from the amplifier 218 is referred to as measurement electric signal. Obtaining the measurement electric signal corresponds to a measurement of the light intensity of the slave laser light pulse.

The measurement electric signal is obtained by amplifying the output from the photodiode 216 by the amplifier 218, and thus has a voltage based on the light intensity of the slave laser light pulse. Moreover, the measurement electric signal has passed through the low-pass filter 217, and thus has the frequency close to the frequency of the predetermined value of 50 MHz.

The low-pass filter 217 and the amplifier 218 may be switched as the low-pass filter 117 and the amplifier 118 may be switched. In either case, the measurement electric signal remains the signal based on the output from the low-pass filter 217.

The reference comparator 222 is the same as the reference comparator 122, and a description thereof is therefore omitted.

The measurement comparator 215 is a component similar to the measurement comparator 115, compares the voltage of the measurement electric signal (voltage based on the light intensity of the slave laser light pulse) and a predetermined voltage (such as the ground electric potential), and outputs a result thereof. In other words, the measurement comparator 215 receives the output from the amplifier 218 and the predetermined voltage, compares both of them with each other, and outputs a result thereof.

The phase comparator (phase difference detector) 232 is a component similar to the phase comparator 132, and detects and outputs the phase difference between the output from the reference comparator 222 and the output from the measurement comparator 215.

The loop filter 234 is a component similar to the loop filter 134, and removes a high-frequency component of the output from the phase comparator 232.

The piezo driver 236 is a component similar to the piezo driver 136, and amplifies the output from the adder 235. The output from the piezo driver 236 is fed to the piezo element 212p. As a result, the piezo element 212p extends/contracts in the X direction. It should be noted that the piezo element 212p is extended/contracted so that the phase difference detected by the phase comparator 232 is a constant value (such as 0 degree, 90 degrees, or −90 degrees). As a result, the repetition frequency of the slave laser light pulse can be made to coincide with the value (considered to be close to 50 MHz) which is addition of the value corresponding to the repetition frequency control signal to 50 MHz (frequency of the reference electric signal).

The adder 235 adds the repetition frequency control signal to an output from the loop filter 234, and outputs a result of the addition.

The repetition frequency control signal source 238 is an arbitrary waveform generator, for example, and outputs the repetition frequency control signal. The repetition frequency control signal has a constant repetition cycle. The repetition frequency control signal may be illustrated as a sinusoidal wave (refer to FIG. 3(a)), or may repeat linear increase and decrease (refer to FIG. 4(a)) if the time is assigned to the horizontal axis, for example. It should be noted that the repetition frequency control signal is a signal having a repetition frequency approximately 250 Hz.

A description will now be given of an operation of the embodiment of the present invention.

(1) Before Output of Repetition Frequency Control Signal

In this case, the operation of the repetition frequency control device 1 is similar to that of an ordinary PLL circuit. In other words, the repetition frequencies of the master laser light pulse and the slave laser light pulse reach 50 MHz.

A description will now be given of an operation if the repetition frequency of the master laser light pulse becomes 50 MHz. The same holds true for the repetition frequency of the slave laser light pulse.

Referring to FIG. 2(b), the reference electric signal having the predetermined frequency (50 MHz, for example) is output from the reference electric signal source 121. Moreover, the comparison result between the voltage of the reference electric signal and the ground electric potential (=0[V]) is output from the reference comparator 122. As a result, the pulse having the repetition frequency of 50 MHz is output from the reference comparator 122.

On this occasion, referring to FIG. 2(a), it is assumed that the repetition frequency of the master laser light pulse is deviated from 50 MHz, and the phase of the output waveform of the amplifier 118 is deviated from the phase of the output waveform of the reference electric signal source 121.

In this case, referring to FIG. 1, the master laser light pulse output by the master laser 112 is partially led to the photodiode 116 by the optical coupler 114, undergoes the photoelectric conversion, and passes through the low-pass filter 117, resulting in the high-frequency component being removed. The output from the low-pass filter 117 is further amplified by the amplifier 118, and is compared by the measurement comparator 115 with the voltage of the phase control signal, which is equal to ground electric potential (=0 [V]).

The phase comparator 132 compares the phase of the output from the measurement comparator 115 and the phase of the output from the reference comparator 122, and detects and outputs the phase difference therebetween. The high-frequency component is removed from the output from the phase comparator 132 by the loop filter 134, and the resulting output is amplified by the piezo driver 136, and is fed to the piezo element 112p. The piezo element 112p contracts/extends so that the phase difference detected by the phase comparator 132 has a constant value (0 degree, 90 degrees, or −90 degrees, for example). As a result, it is possible to precisely make the repetition frequency of the master laser light pulse coincide with the frequency 50 MHz of the reference electric signal.

If a control is provided so that the phase difference detected by the phase comparator 132 is 0 degree, the output waveform of the measurement comparator 115 comes to shift leftward, and overlaps the output waveform of the reference comparator 122 in FIG. 2. Then, the output waveform of the amplifier 118 coincides with the output waveform of the reference electric signal source 121. It is thus possible to precisely make the repetition frequency of the master laser light pulse coincide with the frequency 50 MHz of the reference electric signal.

After the repetition frequencies of the master laser light pulse and the slave laser light pulse coincide with the predetermined value f0 (=50 MHz), if there is no interference, and the voltages applied on the piezo elements 112p and 212p are maintained constant, the repetition frequencies of the master laser light pulse and the slave laser light pulse can be maintained to the predetermined value.

Figure 3:
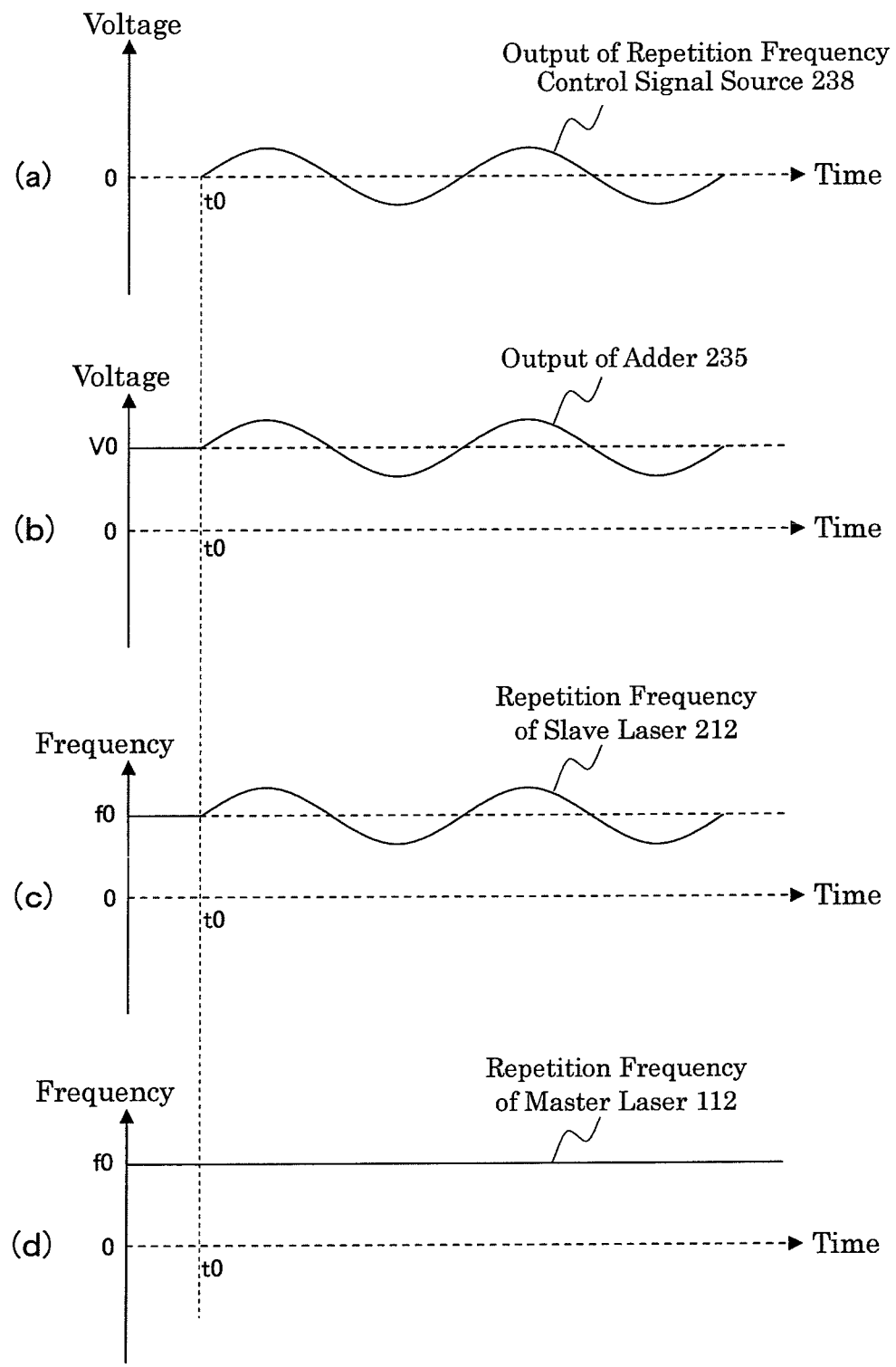
FIG. 3 shows the output from the repetition frequency control signal source 238 (FIG. 3(*a*)), the output from the adder 235 (FIG. 3(*b*)), the repetition frequency of the slave laser 212 (FIG. 3(*c*)), and the repetition frequency of the master laser 112 (FIG. 3(*d*))

FIG. 3 shows the output from the repetition frequency control signal source 238 (FIG. 3(a)), the output from the adder 235 (FIG. 3(b)), the repetition frequency of the slave laser 212 (FIG. 3(c)), and the repetition frequency of the master laser 112 (FIG. 3(d)).

FIG. 3 illustrates a case in which the output from the adder 235 is maintained to V0, and the repetition frequency of the slave laser light pulse is maintained to the predetermined value f0 in a period 0 to t0 (refer to FIGS. 3(b) and 3(c)). Moreover, a case in which the repetition frequency of the master laser light pulse is maintained to the predetermined value f0 in the period 0 to t0 is shown (refer to FIG. 3(d)).

The output of the repetition frequency control signal is started at the time t0 on this occasion.

(2) After Output of Repetition Frequency Control Signal

It is assumed that the repetition frequency control signal is represented as a sinusoidal wave, for example, if the time is assigned to the horizontal axis (refer to FIG. 3(a)).

The output from the adder 235 then also fluctuates up and down with respect to V0 (refer to FIG. 3(b)).

If the output from the adder 235 increases (decreases), the voltage applied on the piezo element 212p also increases (decreases), and the piezo element 212p extends (contracts). It is assumed that such a design that the laser resonator length of the slave laser 212 becomes short (long) if the piezo element 212p extends (contracts) is provided. Then, the repetition frequency of the slave laser 212 increases (decreases).

The repetition frequency of the slave laser 212 thus fluctuates up and down as the output from the adder 235 (refer to FIG. 3(c)). The value fluctuating up and down of the repetition frequency of the slave laser 212 is a value corresponding to the repetition frequency control signal.

On the other hand, the repetition frequency of the master laser light pulse does not particularly fluctuate (refer to FIG. 3(d)).

Figure 4:
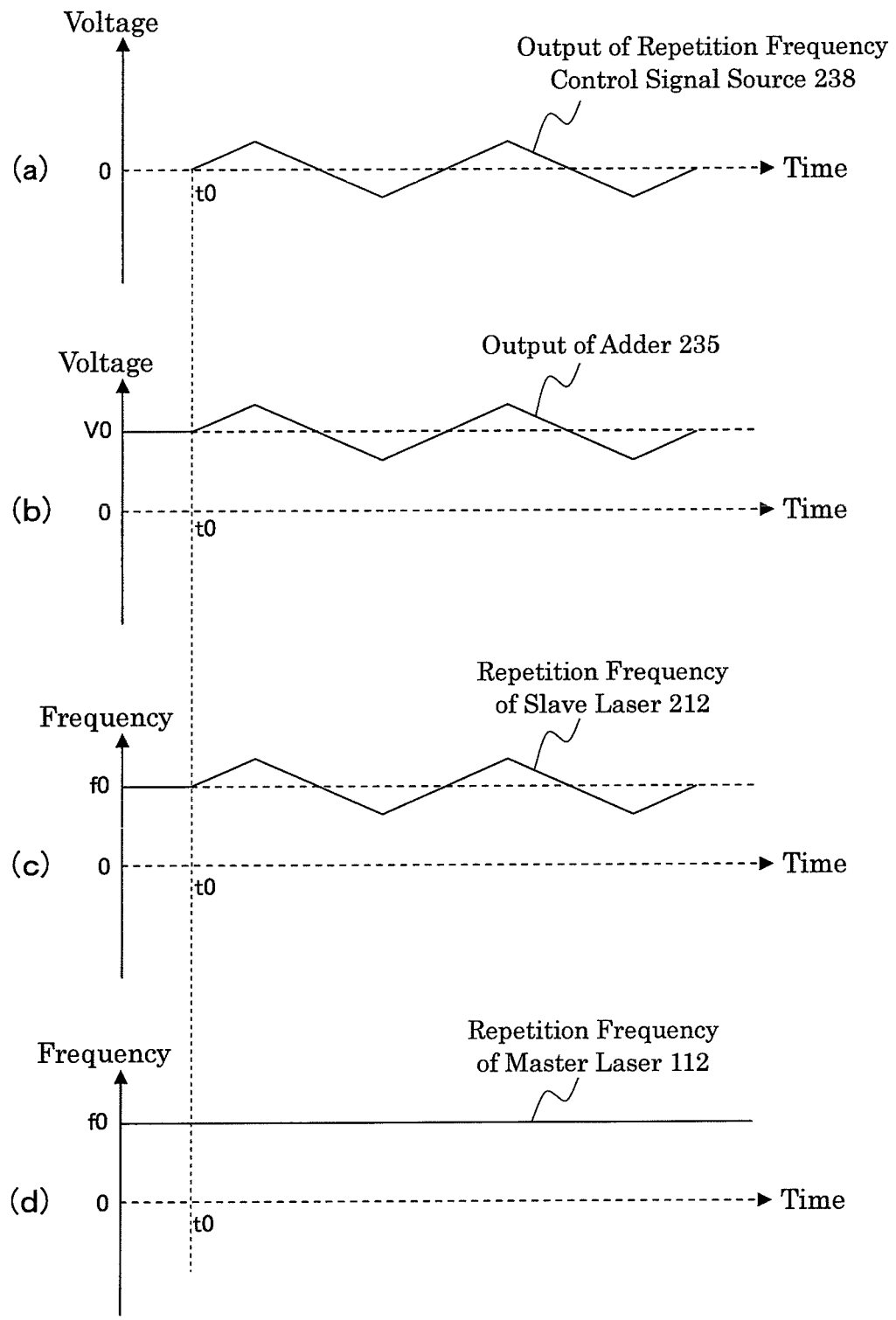
FIG. 4 shows a variation in the output of the repetition frequency control signal, and shows the output from the repetition frequency control signal source 238 (FIG. 4(*a*)), the output from the adder 235 (FIG. 4(*b*)), the repetition frequency of the slave laser 212 (FIG. 4(*c*)), and the repetition frequency of the master laser 112 (FIG. 4(*d*)).

FIG. 4 shows a variation in the output of the repetition frequency control signal, and shows the output from the repetition frequency control signal source 238 (FIG. 4(a)), the output from the adder 235 (FIG. 4(b)), the repetition frequency of the slave laser 212 (FIG. 4(c)), and the repetition frequency of the master laser 112 (FIG. 4(d)).

The repetition frequency control signal may repeat linear increase/decrease if the time is assigned to the horizontal axis (FIG. 4(a)), and the output of the adder 235 (refer to FIG. 4(b)), the repetition frequency of the slave laser 212 (refer to FIG. 4(c)), the repetition frequency of the master laser light pulse (refer to FIG. 4(d)) are also similar in this case.

According to the embodiment of the present invention, while the repetition frequency of the slave laser 212 fluctuates up and down, the repetition frequency of the master laser 112 is constant, and it is thus possible to cause the difference between the repetition frequencies of the two lasers to fluctuate.

It should be noted that the master laser light pulse and the slave laser light pulse can be used for measurement devices using THz light.

For example, the master laser light pulse is fed to a THz light generator (such as a photoconductive switch) thereby generating THz light, and irradiates the THz light on a device under test. The THz which has transmitted through the device under test or has been reflected by the device under test is fed to a THz light detector (such as a photoconductive switch). On this occasion, the THz light can be detected by feeding the slave laser light pulse to THz light detector. There is a difference in repetition frequency of the master laser light pulse and the slave laser light pulse, and multiple points on a waveform of the THz light which has transmitted through or reflected by the device under test can be observed.

The invention claimed is:

1. A repetition frequency control device comprising:
   a master laser that outputs a master laser light pulse, the repetition frequency of which is controlled to a predetermined value;
   a master-side reference comparator that compares a voltage of a reference electric signal, the frequency of which is the predetermined value, and a predetermined voltage with each other, thereby outputting a result thereof;
   a master-side measurement comparator that compares a voltage of a master-side measurement electric signal having a voltage based on a light intensity of the master laser light pulse, and a frequency of the predetermined value, and the predetermined voltage with each other, thereby outputting a result thereof;
   a master-side phase difference detector that detects a phase difference between the output from the master-side reference comparator and the output from the master-side measurement comparator; and
   a master-side loop filter that removes a high-frequency component of an output from the master-side phase difference detector,
   wherein the repetition frequency of the master laser light pulse changes according to an output from the master-side loop filter;
   a slave laser that outputs a slave laser light pulse;
   a slave-side reference comparator that compares a voltage of the reference electric signal, the repetition frequency of which is the predetermined value, and a predetermined voltage with each other, thereby outputting a result thereof;
   a slave-side measurement comparator that compares the voltage based on a light intensity of the slave laser light pulse and the predetermined voltage with each other, thereby outputting a result thereof;

a slave-side phase difference detector that detects a phase difference between the output from the slave-side reference comparator and the output from the slave-side measurement comparator;

a slave-side loop filter that removes a high-frequency component of an output from the slave-side phase difference detector; and an adder that adds a repetition frequency control signal to an output from the slave-side loop filter, wherein:

the repetition frequency control signal has a constant repetition cycle; and the repetition frequency of the slave laser light pulse changes according to the output from the adder.

2. The repetition frequency control device according to claim 1, wherein the predetermined voltage is a ground electric potential.

3. The repetition frequency control device according to claim 1, wherein the resonator length of the slave laser changes according to the output from the adder.

4. The repetition frequency control device according to claim 3, wherein:

the slave laser comprises a piezo element;

the output from the adder is fed to the piezo element; and the resonator length of the slave laser is changed by extension and contraction of the piezo element.

5. The repetition frequency control device according to claim 1, comprising:

a photoelectric converter that receives the slave laser light pulse; and a low-pass filter that removes a high-frequency component of the output from the photoelectric converter.

6. The repetition frequency control device according to claim 1, wherein the repetition frequency control signal is output from an arbitrary wave generator.

7. The repetition frequency control device according to claim 1, comprising:

a master-side reference comparator that compares the voltage of the reference electric signal the frequency of which is the predetermined value and the predetermined voltage with each other, thereby outputting a result thereof;

a master side measurement comparator that compares a voltage of a master-side measurement electric signal having a voltage based on a light intensity of the master laser light pulse, and a frequency of the predetermined value, and the predetermined voltage with each other, thereby outputting a result thereof;

a master-side phase difference detector that detects a phase difference between the output from the master-side reference comparator and the output from the master-side measurement comparator; and a master-side loop filter that removes a high-frequency component of an output from the master-side phase difference detector, wherein the repetition frequency of the master laser light pulse changes according to an output from the master-side loop filter.

* * * * *